United States Patent
MacQuarrie

(10) Patent No.: US 10,757,952 B2
(45) Date of Patent: Sep. 1, 2020

(54) VEGETABLE CASING FILM AND METHOD FOR PRODUCTION OF TUBULAR SAUSAGE CASINGS

(71) Applicant: Living Cell Research Inc., Toronto (CA)

(72) Inventor: Reg MacQuarrie, Toronto (CA)

(73) Assignee: LIVING CELL RESEARCH INC., Toronto (CA)

( * ) Notice: Subject to any disclaimer, the term of this patent is extended or adjusted under 35 U.S.C. 154(b) by 186 days.

(21) Appl. No.: 15/238,983

(22) Filed: Aug. 17, 2016

(65) Prior Publication Data

US 2017/0042167 A1 Feb. 16, 2017

Related U.S. Application Data

(63) Continuation of application No. 12/149,768, filed on May 7, 2008, now abandoned.

(51) Int. Cl.
*A22C 13/00* (2006.01)

(52) U.S. Cl.
CPC .......... *A22C 13/0013* (2013.01); *A22C 13/00* (2013.01); *A22C 2013/0069* (2013.01); *Y10T 428/1324* (2015.01)

(58) Field of Classification Search
CPC ............... A22C 13/0013; A22C 13/00; A22C 2013/0069; Y10T 428/1324
See application file for complete search history.

(56) References Cited

U.S. PATENT DOCUMENTS

| | | | |
|---|---|---|---|
| 4,264,633 A | 4/1981 | Bradshaw | |
| 4,478,670 A | 10/1984 | Heyse et al. | |
| 4,562,101 A | 12/1985 | Andra et al. | |
| 4,580,316 A | 4/1986 | Gunter | |
| 4,683,615 A | 8/1987 | Tomczak et al. | |
| 5,620,757 A | 4/1997 | Ninomiya et al. | |
| 5,928,737 A | 7/1999 | Hammer et al. | |
| 5,962,053 A | 10/1999 | Merritt, II | |
| 6,730,340 B1 | 5/2004 | Macquarrie et al. | |
| 2002/0187220 A1 | 12/2002 | Luhadiya | |
| 2005/0112247 A1 | 5/2005 | Stalberg et al. | |
| 2005/0181020 A1 | 8/2005 | MacQuarrie | |

FOREIGN PATENT DOCUMENTS

| | | |
|---|---|---|
| CA | 2007522 | 1/1991 |
| CA | 2295637 | 1/1999 |
| CA | 2372642 | 11/2000 |
| CN | 1232642 | 10/1999 |
| CN | 1676024 | 10/2005 |
| EP | 0 935 921 | 8/1999 |
| EP | 1586243 | 10/2005 |
| JP | 58-201940 | 11/1983 |
| JP | 07-322812 | 12/1995 |
| JP | 11-313619 | 11/1999 |
| JP | 2001-509525 | 7/2001 |
| JP | 2005-526504 | 9/2005 |
| WO | 00/67582 | 11/2000 |

OTHER PUBLICATIONS

English Professional Translation of CN 1232642.

*Primary Examiner* — James C Yager
(74) *Attorney, Agent, or Firm* — Shlesinger, Arkwright & Garvey LLP

(57) ABSTRACT

Tubular sausage casings can be prepared from non-animal materials, primarily starches and flours by film-casting followed by gluing with an edible glue composed of konjac and carrageenan. In this way, it has been made possible to prepare non-animal meat casings commercially, that can be used with conventional sausage production technology.

2 Claims, No Drawings

VEGETABLE CASING FILM AND METHOD FOR PRODUCTION OF TUBULAR SAUSAGE CASINGS

CROSS-REFERENCE TO RELATED APPLICATIONS

This application is a continuation of U.S. Ser. No. 12/149,768, filed on May 7, 2008, which is incorporated herein by reference in its entirely.

BACKGROUND OF THE INVENTION

1. Field of the Invention

This invention relates to novel vegetable based edible films which can be used in the processing of meat products, particularly as sausage casings.

2. Description of the Prior Art

Traditionally, edible sausage casings have been manufactured through a process of extrusion into a tubular hose material made of regenerated beef collagen. A conventional synthetic or natural casing is formed as a long, continuous tube which is drawn from a supply source.

In order to use the casing efficiently and effectively, an individual length of the hose material drawn from the source is "shirred" (gathered up longitudinally). This allows a large quantity of casing to be folded and positioned in a sausage or food packing machine for subsequent controlled unfolding as required as the casing material is filled with product. The shirring of casings for meat products such as sausage is well known in the food processing art. Two typical examples of the numerous prior art patents disclosing equipment for the shirring of casing are afforded by U.S. Pat. No. 4,580,316 (Günter) and U.S. Pat. No. 4,683,615 (Thomczak et al).

Increasingly, it has been sought to prepare food sealing and packaging materials comprising only non-animal based natural materials, owing to dietary and other considerations. U.S. Pat. No. 5,620,757 (Ninomiya et al) describes a multilayer heat-sealable edible film for sealing and packaging materials like powdered soup, flavoring oil, dried vegetables, etc., which comprises a water-soluble polysaccharide film layer (chiefly carrageenan, a polyhydric alcohol and water) and a subfilm layer containing a combination of soybean protein and gelatin.

U.S. Pat. No. 6,730,340 (MacQuarrie et al) describes edible casing film formulations incorporating carrageenan in conjunction with konjac and/or Gellan gums. Such a film, in a typical application, is wrapped around a meat substrate (turkey, ham, chicken) and the wrapped meat dried in a convection oven, until a protein skin is seen to form. Cooking is then completed in a steam cooker. The film exhibits a number of desirable properties, including pleasing edibility and imparting an appealing surface appearance to the cooked product.

However, despite the evident desirability of doing so, it has not been possible commercially to prepare non-animal meat casings using standard sausage production technology based on a shirred tubular casing. Because of their abundant availability and presence in many food products, starch or flour would appear to be the ideal raw material for all-vegetable based sausage casing. However most gum and starches do not exhibit the kind of phenoplastic properties which will allow the production of a homogeneous tube structure by extruding the polymer through a die set to an appropriate diameter, tube wall thickness, etc. U.S. Pat. No. 5,928,737 (Hammer et al) describes the extrusion into sausage casings of compositions based on natural starch which has been converted into an amorphous state by drying potato starch in vacuo, mixing with glycerol and kneading the mixture at an elevated temperature followed by extrusion and granulation to prepare a thermoplastic starch composition. This must additionally be compounded with gelatin and chitosan in order to be extrudable. However, this material, too, has not proven useful using standard sausage production technology based on a shirred tubular casing.

Some high-amylose starches have been successfully extruded into sheets and tubing or various dimensions, but such systems require inconvenient higher than atmospheric pressures to effect complete hydration of the polymers. Moreover, the finished products have typically been found to be too brittle and otherwise unsuitable for use as sausage casing.

The aforementioned U.S. '757 and '340 patents and many others take advantage of the well known film-forming abilities of starches and gums. Typically, these films are formed from a liquid slurry of the gums/starches in water, which is then cast upon a hot surface until sufficient water is thereby removed to produce the end film. However, only flat foils can be produced by this casting system, which are not suitable for the conventional production of tubes and other profile-type products.

While forming of a casing tube from a flat film section incorporating conventional hydrocolloids by folding the cast film into a tube and heat-sealing the edges was considered, the fact is that only a relatively narrow range of compositions is capable of being heat-sealed. Moreover, the intense heat necessary for effectively sealing a film to itself was found to cause excessive moisture loss in films of these compositions, leading to undesirable mechanical end properties, discoloration along the seal line and distortion of the body of the film.

SUMMARY OF THE INVENTION

I have found that selected compositions, primarily of starch or flour, with other portions of gums, water and plasticizer can be cast into films which may be formed into tubes and sealed using edible glues. Suitable glues are composed primarily of natural gums, starches and modifying agents. Such tubes are suitable for producing meat casings conventionally, using normal production parameters.

GENERAL DISCUSSION OF THE INVENTION

After numerous trials, it was determined that the optimal sealing system utilizes an edible glue as a means to stick and hold the film edges together to form a tube having the desired uniform shape and size. The glue can be applied using standard glue dosage systems and, provided the glue has enough wet tack, the film will immediately adhere to itself. It is of critical importance that the glue be composed of non-animal based materials, and that the glue function in wet environments to maintain the bond between the layers of film.

The seal can be further strengthened by drying the glued portion to set the glue further using radiant or ultrasonic heating or other means.

A suitable film for use as vegetable based sausage casing should possess the following properties:
1. The film should be transparent with no opacity of color.
2. The film should exhibit sufficient wet strength to ensure that the casing does not burst during stuffing.

3. The film should not expand unevenly producing a sausage of irregular size and shape.
4. The film should possess adhesive properties adequate to ensure that it will bind to the meat emulsion.
5. The film should not discolor during normal cooking procedures such as frying, deep frying, baking or boiling.
6. The components of the film should be non allergenic and non animal based. ("non-allergenic" precludes the use of common Soya, milk or egg proteins.)
7. The film must be composed of GRAS listed ingredients (Generally Regarded as Safe)
8. The film should be bacteriologically inert and not subject to mold or yeast growth.
9. The film should be stable in refrigerated and frozen conditions.
10. The film should not be subjected to drying, or left exposed to low humidity conditions.

A suitable glue system for use according to the invention is required to have the following properties:
1. The glue needs to be composed of edible components as defined by the Food Chemical Codex.
2. The glue needs to have sufficient wet tack to ensure that the film will immediately bind to itself and not release during subsequent handling.
3. The glue needs to dry to form a clear glue line so that it is not visible in the overlap of the finished product.
4. The glue should have sufficient wet strength to ensure that the hydrated seam will not release during stuffing of the casing.
5. The glue should be essentially tasteless.
6. The glue should be composed of non allergenic compounds.
7. The glue should not be composed of any animal derived products.
8. The glue should be microbially stable in the dry state.

Sausage casing films according to the present invention are typically made by a solution casting production method. In this process, the film polymers and other components are initially added to a water solution which is typically at a temperature of greater than 85° C. The solution is mixed under vacuum until the polymers are completely dissolved with no visible lumps. After the main film formers are dissolved, additional film modifiers and plasticizers are optionally added and the complete solution mixed until completely homogenous and free of air.

The solution is then pumped though an extrusion die or into a casting box onto a carrier for passage through a drying tunnel. Heat is applied to the casting surface and above the solution until the required amount of moisture is removed. Film is normally removed from the carrier system and wound onto a carrier roll for further processing. Films are finally cut down to the required flat width and then wound onto the required roll.

During this production the film is normally coated with an antiblocking material such as starch to prevent the film from sticking to itself.

The glue is applied by injecting the required amount onto edge surfaces of the film prior to folding the film onto itself. The folded tube is then wound onto itself and rolled up. The viscosity of the glue and solids level is optimized to ensure there is enough wet tack to hold the films in place. Ideally the glue is heated to approximately 75° C. prior to application to ensure that the film seal gels irreversibly.

DESCRIPTION OF PREFERRED EMBODIMENTS

Various film polymers were tested to determine the optimum formulations for use in various sausage products.

The most effective films were obtained through the combination of starches and flours with strong gelling gums like carrageenan, gellan and agar. The preparation of starch to other polymeric materials is preferably in the range of 40 to 65% by weight.

The ideal films for most sausage applications were composed primarily of rice flours which imparted to the films improved adhesive qualities in the casing format.

The resultant films from these systems satisfied the film criteria could be modified for various solubility parameters—ranging from casings that dissolve onto the meat surface to casings that withstand vigorous cooking with elevated temperatures and high humidity.

The most effective glue system was found to be a combination of konjac with carrageenan in a range of 60-90% konjac, with a suitably adjusted proportion of water.

Glues composed of a combination of these gums satisfied the above conditions and worked well on traditional glue systems. Such glues exhibited good wet tack and strong bonding characteristics when dry, and were found to have water resistance (did not dissolve when exposed to excessive amounts of water).

Examples of Particular Dry Film Formulations

Example 1

| Components | % (Dry Film) |
| --- | --- |
| Water | 16.37 |
| Kappa Carrageenan | 21.71 |
| Potato Starch | 6.68 |
| Rice Flour | 26.72 |
| Dextrose | 6.68 |
| Sorbitan Monostearate | 1.80 |
| Propylene Glycol | 20.04 |

Example 2

| Components | % Dry Film |
| --- | --- |
| Water | 15.50 |
| Kappa Carrageenan | 26.72 |
| Tapioca starch | 26.72 |
| Dextrose | 5.50 |
| Sorbitan Monostearate | 1.60 |
| Propylene Glycol | 23.96 |

Example 3

| Components | % Dry Film |
| --- | --- |
| Water | 15.90 |
| Kappa Carrageenan | 18.40 |
| Modified Corn starch | 45.45 |
| Maltodextrin | 8.00 |
| Sorbitan Monostearate | 7.25 |
| Glycerin | 5.00 |

Example 4

| Components | % Dry Film |
|---|---|
| Water | 14.60 |
| Konjac | 8.50 |
| Modified Tapioca starch | 19.00 |
| Rice Flour | 34.82 |
| Dextrose | 4.75 |
| Sorbitan Monostearate | 1.50 |
| Propylene glycol | 7.60 |
| Glycerin | 9.23 |

For use as sausage casing materials, films of these and like compositions are produced in thicknesses ranging from 25 to 75 microns. Once tubular casings are formed by sealing these films with edible glue as described above, the completed tube is shirred, preferably on a 1:40 to 1:80 ratio.

Optional Film Additives

Minor amounts of modifiers may be included in the composition of films according to the invention, such as the following:

Coloring Agents
Caramel color can be added to the film to produce precolored casings for specific applications. Additionally spice color preparations from paprika, turmeric and various liquid spice extracts could be utilized. The color agents can also be printed on the film to produce logo's, grill marks or other types of print to impart the casing with various types of design.

Flavoring Agents
The film can be formulated to include both natural and artificial flavours including rosemary extract, oregano extract, maple flavour, sweeteners, and honey flavours.

Antimicrobial Agents
The initial film slurry can be modified with the addition of standard and specific antimicrobial agents to help preserve the finished product. The preferred products would include sorbates, benzoates, and soluble lactates such as sodium lactate. Methyl and propyl parabens could also be used for mold control.

Antioxidants
To prevent the rapid oxidation of high, fat containing products. Both natural and artificial antioxidants can be added to the casing to reduce the rate of oxidation in the products. The types of compounds that could be used include rosemary extracts, oregano extracts and ascorbic acid derivatives. Synthetic antioxidants could also be used such as BHA and BHT.

As noted above, the present invention provides the first vegetable based hose material for use as sausage casing which can be employed in the conventionally automated manufacture of string sausages on a sausage stuffing machine, wherein individual lengths of hose material are shirred prior to each section of the casing being filled. The shirr ratio is the length of a fully elongated tube section to its compressed (gathered up) length. I have found that sealed tubing according to the invention is best shirred at a 1:40 to 1:80 ratio for sausage production.

Normally, during a shirring process the tube is inflated with air and then mechanically folded onto a mandrel. The process will typically utilize some type of shirring fluid to ensure that the folding occurs in a consistent way and that the folds remain in place following shirring. For conventional casings, the most common shirring fluids utilized are water and mineral oil. I have found, however, that with vegetable based sausage casings according to the present invention an aqueous shirring fluid causes the film to deteriorate. However, propylene glycol has been found to be a suitable substitute for water to obtain good results in the preparation of a tubular product.

While these formulations illustrate the invention, one of ordinary skill in the art will appreciate that other specific formulations according to the invention, will be suitable for the purposes of the invention as well. Accordingly, the scope of the invention is as described herein and defined in the attached claims.

I claim:

1. A tubular material for use as a sausage casing, wherein the tubular material comprises, in combination:
   a vegetable based edible casing film having a tubular shape and including an edge seal comprising side edges of the casing film which are sealed together; and
   an edible glue provided on the side edges of the casing film, whereby the edible glue holds the side edges of the film together to provide said tubular shape;
   wherein the vegetable-based edible casing film is composed of edible vegetable-based polymeric materials consisting of a major portion of starch and a minor portion of adjunctive polymeric materials, water, and one or both of glycerin and propylene glycol;
   wherein the adjunctive polymeric materials are selected from the group consisting of carrageenan, agar, gellan gum and high gelling starches;
   wherein the vegetable-based edible casing film comprises from 0 to 8.50 wt % konjac; and
   wherein said edible glue consists of konjac, carrageenan and water, wherein the konjac content of the edible glue is 60-90% of a combined amount of konjac with carrageenan.

2. A sausage casing material produced by shirring the tubular material of claim 1 on a 1:40 to 1:80 ratio.

* * * * *